(12) United States Patent
Flynn

(10) Patent No.: US 6,886,361 B2
(45) Date of Patent: May 3, 2005

(54) LIQUID CHILLER EVAPORATOR

(75) Inventor: Kevin Flynn, Novato, CA (US)

(73) Assignee: IGC-Polycold Systems, Inc., Petaluma, CA (US)

(*) Notice: Subject to any disclaimer, the term of this patent is extended or adjusted under 35 U.S.C. 154(b) by 234 days.

(21) Appl. No.: 10/412,750

(22) Filed: Apr. 11, 2003

(65) Prior Publication Data
US 2003/0217565 A1 Nov. 27, 2003

Related U.S. Application Data

(63) Continuation-in-part of application No. 09/894,965, filed on Jun. 28, 2001, now abandoned.
(60) Provisional application No. 60/214,565, filed on Jun. 28, 2000.

(51) Int. Cl.[7] ............ F25D 17/02; F25B 43/02; F28F 19/00; F28D 07/12
(52) U.S. Cl. ............ 62/434; 62/470; 165/41; 165/134.1; 165/155; 165/156; 165/161; 165/291
(58) Field of Search ............ 62/434, 470; 165/155, 165/156, 41, 291, 134, 161

(56) References Cited

U.S. PATENT DOCUMENTS

| 1,922,149 A | 8/1933 | Baumann |
| 2,146,141 A | 2/1939 | Harris |
| 2,462,012 A | 2/1949 | Vilter |
| 3,400,757 A | 9/1968 | Campbell |
| 4,895,203 A | 1/1990 | McLaren |
| 5,197,537 A | 3/1993 | Chigira et al. |
| 5,542,266 A * | 8/1996 | Suzuki et al. ............ 62/469 |
| 6,293,335 B1 | 9/2001 | Tawney et al. |

* cited by examiner

Primary Examiner—Denise Esguivel
Assistant Examiner—Filip Zec
(74) Attorney, Agent, or Firm—Katten Muchin Zavis Rosenman

(57) ABSTRACT

A shell and coil type heat exchanger evaporator provides cooling for industrial coolants characterized by high viscosity and a poor heat transfer coefficient. A large heat transfer surface area is provided within a limited volume, and without a high coolant pressure drop. A short initial cool down period is provided due to minimized heat exchanger mass and minimized volume of liquid coolant in the heat exchanger during initial cool down.

31 Claims, 2 Drawing Sheets

LIQUID CHILLER EVAPORATOR

This application is a continuation in part of application Ser. No. 09/894,965 filed Jun. 28, 2001, now abandoned, which claims the benefit of earlier filed and provisional application No. 60/214,565 filed Jun. 28, 2000.

BACKGROUND OF THE INVENTION

This invention is directed to providing industrial coolants, characterized by high viscosity and a poor heat transfer coefficient, flowing through an evaporator at a rate of 200 grams/sec (2 gallons/main) at temperatures between –80 and –100 C. More particularly this invention defines a highly efficient and compact cylindrical evaporator construction intended to provide cooling to Galden TH 70 (a commercial coolant) while maintaining a pressure drop across the evaporator not exceeding 2 PSI. The thermal masses of the evaporator and of the coolant in contact with the evaporator during the initial cool down of the evaporator are minimized.

Refrigeration systems have been in existence since the early 1900s, when reliable sealed refrigeration systems were developed. Since that time, improvements in refrigeration technology have proven their utility in both residential and industrial settings. In particular, very low temperature refrigeration systems, colder than –20 C, currently provide essential industrial functions in biomedical applications, cryoelectronics, coating operations conducted in a vacuum (i.e. physical vapor deposition), semiconductor manufacturing applications, control of chemical reactions and pharmaceutical manufacturing processes. Another application involves thermal radiation shielding. In this application large panels are cooled to very low temperatures. These cooled panels intercept radiant heat from vacuum chamber surfaces and heaters. This can reduce the heat load on surfaces being cooled to lower temperatures than the panels. Yet another application is the removal of heat from objects being manufactured. In some cases the object is an aluminum disc for a computer hard drive, a silicon wafer for an integrated circuit, or the material for a flat panel display. In these cases the very low temperature provides a means for removing heat from these objects more rapidly than other means, even though the object's final temperature at the end of the process step may be higher than room temperature. Further, some applications involving hard disc drive media, silicon wafers, or flat panel display material, include the deposition of material onto these objects. In such cases heat is released from the object as a result of the deposition and this heat must be removed while maintaining the object within prescribed temperatures. Cooling a surface, like a platen, is the typical means of removing heat from such objects.

In many of these applications, such as the semiconductor device manufacturing industry, it is necessary that refrigeration systems provide very low temperature refrigeration to highly viscous industrial coolants with poor heat transfer coefficients. Highly viscous coolants provide several challenges and limitations to such systems, especially the evaporator of the refrigeration system. Additionally, in many such applications evaporator designs are further limited by size restrictions and a necessity to be compatible with customer systems already in place. A coolant is used as an intermediate fluid instead of direct thermal contact with the refrigerant in cases where the process tubing and heat exchanger are not rated for high design pressures required by refrigeration processes. Using a secondary coolant (usually a liquid, but sometimes a gas) allows the process at the load where the heat is removed to be operated with the coolant at much lower pressure than the pressure that the refrigerant process must operate.

This invention relates to refrigeration systems which provide refrigeration at temperatures between –20 C. and –150 C by use of a secondary cooling fluid or coolant. The temperatures encompassed in this range are variously referred to as low, ultra low and cryogenic. For purposes of this application the term "very low" or very low temperature will be used to mean the temperature range of –20 C. to –150 C.

Industrial applications that require very low temperature cooling often find it necessary to provide such cooling to liquid coolants that become highly viscous at such temperatures. As a liquid coolant is pumped through a closed loop system, the pressure drop experienced by the coolant as it flows through the evaporator affects the heat load on the refrigeration system, since higher coolant pressure drops require greater pump work. Greater pump work results in a greater increase in the fluid temperature rise during the pumping process and results in a higher heat load of the refrigeration system.

Many system configurations require limitations on the size of components, such as an evaporator. In the case of evaporator size restrictions, it is still necessary for the evaporator to supply the required cooling, or it is of no use. Evaporators typically achieve improved heat transfer effectiveness and overall refrigeration cycle efficiencies by including a larger heat transfer area. However, the inclusion of a large heat transfer surface area in a limited volume may present a significant challenge.

Many systems also require a quick initial cool down time. This is complicated by the high viscosity and low thermal conductivity of very low temperature industrial coolants. These physical limitations tend to result in larger heat exchangers since tight fin spacing increases pressure drop. Larger heat exchangers have more mass to be cooled on initial cool down. In addition, a larger heat exchanger typically requires a larger volume to be filled with liquid. This large volume of liquid represents an additional mass to be cooled initially. Therefore, an effective design minimizes heat exchanger mass and coolant volume, while maximizing flow passages (fin spacing). Due to the very high viscosity of the fluid, heat exchangers often will be operating with the fluid flow in the laminar flow regime. To minimize pressure drop, very low Reynolds number flow is required. A limitation of laminar flow is that fully developed laminar flow is difficult to alter in a way that enhances the heat transfer rate. Therefore, an effective, compact design must prevent fully developed flow. Understanding of fully developed flow and the development of fully developed flow relates to the formation of a boundary layer. The physics of boundary layers is well known to those skilled in the art of heat exchanger design. For reference, an excellent discussion of laminar flow heat transfer in boundary layers and fully developed laminar flow is given by "Convective Heat and Mass Transfer," Kays and Crawford, McGraw Hill, 1980.

Galden TH 70 is an industrial coolant widely used in the semiconductor manufacturing industry characterized by high viscosity (especially at cold temperatures), a poor heat transfer coefficient, and a tendency to freeze out at temperatures below –120 C. These characteristics present many limitations and challenges to the design of an evaporator that is to remove heat from such a coolant.

Similar limitations are also experienced by other liquid heat transfer coolants used to provide heat transfer at temperatures below −20 C. Although the current design was originally developed for use with Galden TH 70 it can also be used for other similarly high viscous liquids.

Such very low temperatures are needed for a variety of industrial applications. In the semiconductor industry such very low temperatures are important for processing of semiconductor wafers. In one such example, the deposition of material on a wafer causes heat to be rejected to the wafer, which heat must be removed. Further, such processes must take place within a specified temperature range. Frequently, the process design requires cooling temperatures of −20 C. or colder to achieve desired process conditions. Additionally, very low temperature cooling is needed when the completed wafers are tested.

BACKGROUND PATENTS

U.S. Pat. No. 5,704,123, "Method of making folded, bent and re-expanded heat exchanger tube and assemblies," assigned to Peerless of America, Incorporated (Aptakisic, Ill.), describes a heat exchanger assembly of the side-entry type including at least one fin set and an elongated heat exchanger tube having a collapsed sidewall extending substantially the length of the tube which permits the bending of the elongated heat exchanger tube at the return bend portions and permits expansion of the elongated tube to engage the fin set. Method and apparatus for making the elongated heat exchanger tube having the collapsed sidewall substantially extending the length of the tube as well as methods of making heat exchanger assemblies are disclosed.

U.S. Pat. No. 5,538,075, "Arcuate tubular evaporator heat exchanger," assigned to Eubank Manufacturing Enterprises, Inc. (Longview, Tex.), describes an indoor heat exchange unit and method of making same characterized by an arcuate coil shape heat exchange unit made by bending a single tubing row, planar heat exchange unit to fit within a limited space with an open inlet at one end and blocked at the other end so as to force air to flow past the coil and transfer heat through the fins and tubes of the coil in the process. Also disclosed are preferred embodiments in which an air circulation fan circulates air and where a thermostat controls the flow of heat exchange fluid through the coil as the air is passed through the arcuate coil to obtain a predetermined temperature, or the like, in the air.

U.S. Pat. No. 4,766,736, "Evaporator coil heat exchanger assembly," assigned to Thermal King Corporation (Minneapolis, Minn.), describes an evaporator coil heat exchanger assembly of a refrigeration system, such as a transport refrigeration system, which includes an electrical heating element for rapid defrosting of the evaporator coil with its attendant refrigerant carrying tubes and cooling fins. The electrical heating element is quickly attached to the collective edges of the cooling fins by a plurality of low cost spring retainer clips which have one portion which extends between two closely spaced cooling fins to hook a refrigerant carrying tube, and another portion which holds the heating element against edges of the cooling fins with a spring force. The spring retainer clips may be just as quickly removed should the heating element require replacement. Each spring retainer clip is formed from a single piece of metallic wire having first and second curved end sections, and an intermediate portion which functions both as a spring and as a handle.

U.S. Pat. No. 4,175,617, "Skewed turn coiled tube heat exchanger for refrigerator evaporators," assigned to General Electric Company (Louisville, Ky.), describes a heat exchanger for refrigerator evaporators of the type consisting of helically coiled refrigerant-carrying tubing with radially inward extending fins formed along the length of the coiled tubing, with the air to be refrigerated directed across the axis of the coil turns. The coil turns are skewed from the helix angle to expose a greater proportion of the fins into the air flow path between the coil turns so as to increase the air flow contact with the fins. The skewing is created by relatively offsetting opposite portions of the coil turns along the air flow path across the helical coil to increase the obliqueness of a portion of each coil turn with respect to the direction of air flow. The tube coil includes sections folded into a side-by-side relationship, with the skew direction of the coil sections placed in reverse orientations to increase the length of the flow path of the air circulated through the coils and to position gaps between each of the coil turns in either section opposite the areas in the other coil section occupied by radial fins.

U.S. Pat. No. 4,116,270, "Tubular coiled heat exchanger and device for manufacturing same," invented by Marushkin, Zelenov, Kozlov, et al (all of Moscow), describes a tubular coiled heat exchanger adapted for cooling or heating of various fluids in various fields of industry. The heat exchanger comprises a shell and a core around which tubes having essentially the same length are wound at least in two layers. The tubes may have grooves projecting into the tubes to intensify heat abstraction within the tubes. A member of a streamlined cross-section, such as, a wire, adapted for forming fins is wound around the tubes with a pitch of at least twice the diameter of the wire. The tubes are wound around the core so that the tops of the fins of each tube coil come alternately in contact with those of the fins and with tube surfaces of adjacent coils. The above embodiment of the heat exchanger makes it possible to vary the number of turns of the tubes when winding the tubes being set once without any distance pieces between the layers. This ensures the manufacture of a highly compact heat exchanger featuring high thermal and hydrodynamic properties. The heat exchanger may prove to be most advantageous in cryogenics, in plants for liquefaction and separation of natural gas in particular.

SUMMARY OF THE INVENTION

The present invention is a shell and coil type heat exchanger evaporator that provides desired cooling, for example, to Galden TH 70, an industrial coolant characterized by high viscosity and a poor heat transfer coefficient. The coolant flows through the evaporator at a rate, for this example, of 200 grams/sec (2 gallons/main) at temperatures between −80 and −100 C. with a maximum pressure drop across the evaporator of 2 PSI. The present invention in this example transfers 500 W at −80 C. and provides a heat transfer surface area between 1.4 and 1.7 square meters included within limited evaporator dimensions of approximately twelve inches in length and three to four inches in diameter.

One advantage of the use of the shell and coil type heat exchanging evaporator in accordance with the invention is that it achieves the desired cooling, for example, of Galden TH 70, by providing a large heat transfer surface area within a limited volume, and without a high coolant pressure drop.

A second advantage of the use of the shell and coil type heat exchanging evaporator in accordance with the invention is that it allows a short initial cool down period due to the minimized heat exchanger mass and the minimized volume of liquid coolant to be cooled during initial cool down.

A third advantage is that the current invention describes a refrigerant mixture that can be used to remove heat from the coolant when used in a refrigeration process which cools the coolant heat exchanger (refrigerant evaporator).

A fourth advantage is that the current invention can also be used to cool a gas stream without a high gas pressure drop.

Still other objects and advantages of the invention will be apparent in the specification.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For better understanding of the invention, reference is had to the following description taken in connection with the accompanying drawings, in which.

DESCRIPTION OF PREFERRED EMBODIMENTS

Figure 1:
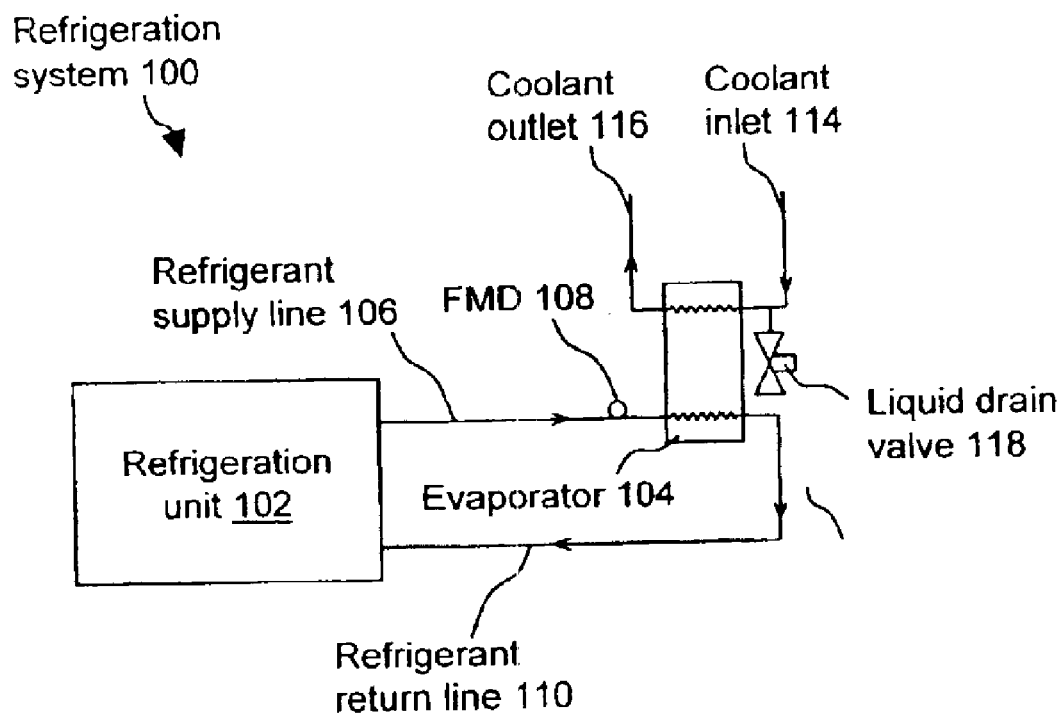
FIG. 1 is a schematic of a very low temperature refrigeration system with a shell and coil type heat exchanging evaporator in accordance with the invention.

FIG. 1 is a block diagram of one generic construction using the shell and coil type heat exchanging evaporator in accordance with the invention. FIG. 1 shows a conventional refrigeration system 100 that includes a refrigeration unit 102 feeding an evaporator 104 via a refrigerant supply line 106. The refrigerant supply line 106 feeds a flow metering device (FMD) 108 which in turn feeds evaporator 104. The loop is closed from evaporator 104 back to refrigeration unit 102 via a refrigerant return line 110. Coolant is pumped into evaporator 104 from a secondary coolant loop (not shown) via a coolant inlet 114, and coolant is pumped out of evaporator 104 into the secondary coolant loop via a coolant outlet 116. Furthermore, a liquid drain valve 118 is connected to coolant inlet 114.

Refrigeration system 100 is a conventional refrigeration system and its basic operation, which is the removal and relocation of heat, is well known in the art. All components within refrigeration system 100 are connected for refrigerant flow.

Refrigeration unit 102 is any refrigeration system or process, such as a single-refrigerant system, a mixed-refrigerant system, normal refrigeration processes, an individual stage of a cascade refrigeration processes, an auto-refrigerating cascade cycle, or a Kleemenko cycle.

More specifically, refrigeration unit 102 may be the IGC Polycold Systems Inc. (San Rafael, Calif.) system (i.e., autorefrigerating cascade process), IGC APD Cryogenics (Allentown, Pa.) system with single expansion device (i.e., single stage cryocooler having no phase separation, Longsworth U.S. Pat. No. 5,441,658), Missimer type cycle (i.e., autorefrigerating cascade, Missimer U.S. Pat. No. 3,768,273), Kleemenko type (i.e., two phase separator system), or a single phase separator system. Also, refrigeration unit 102 may be variations on these processes such as described in Forrest U.S. Pat. No. 4,597,267 and Missimer U.S. Pat. No. 4,535,597.

Several additional basic variations of refrigeration unit 102 shown in FIG. 1 are possible. Refrigeration unit 102 may be one stage of a cascaded system, wherein the condensation of refrigerant is caused by very low temperature refrigerant from another stage of refrigeration. Similarly, the refrigerant produced by the refrigeration unit 102 may be used to cool and liquefy refrigerant of a lower temperature cascade process. Further, the refrigeration unit shown in FIG. 1 uses at least a single compressor. It is recognized that the refrigerant vapor compression effect can be obtained using two or more compressors in parallel, or that the compression process may be broken up into stages via compressors in series or a two stage or multi stage compressor. All of these possible variations are considered to be within the scope of this disclosure.

FMD 108 is any conventional flow metering device, such as a capillary tube, an orifice, a proportional valve with control feedback, or any restrictive element that controls flow. FMD 108 regulates the correct amount of refrigerant flowing into evaporator 104, much like a throttle. FMD 108 is one of the elements separating high-pressure and low-pressure regions within refrigeration system 100.

Liquid drain valve 118 is a normally closed valve that is located at the bottom of the secondary coolant loop. When necessary, liquid coolant is drained out of refrigeration system 100 via liquid drain valve 118. The ability to recover the liquid coolant is important due to the high cost of liquid coolants. A further function of liquid drain valve 118 is to provide a port that is used to fill the coolant passages of refrigeration system 100. This is also very important because trapped air or gas in a liquid loop decreases pump displacement. Therefore, liquid drain valve 118 must be the lowest point of the secondary coolant loop and must have direct plumbing that is continuously downward to prevent the possibility of having any trapped air or gas.

Evaporator 104 of the present invention is a unique shell and finned coil heat exchanger. Refrigerant evaporates and absorbs heat from the coolant within evaporator 104. Evaporator 104 is described in detail in FIG. 2.

Figure 2:
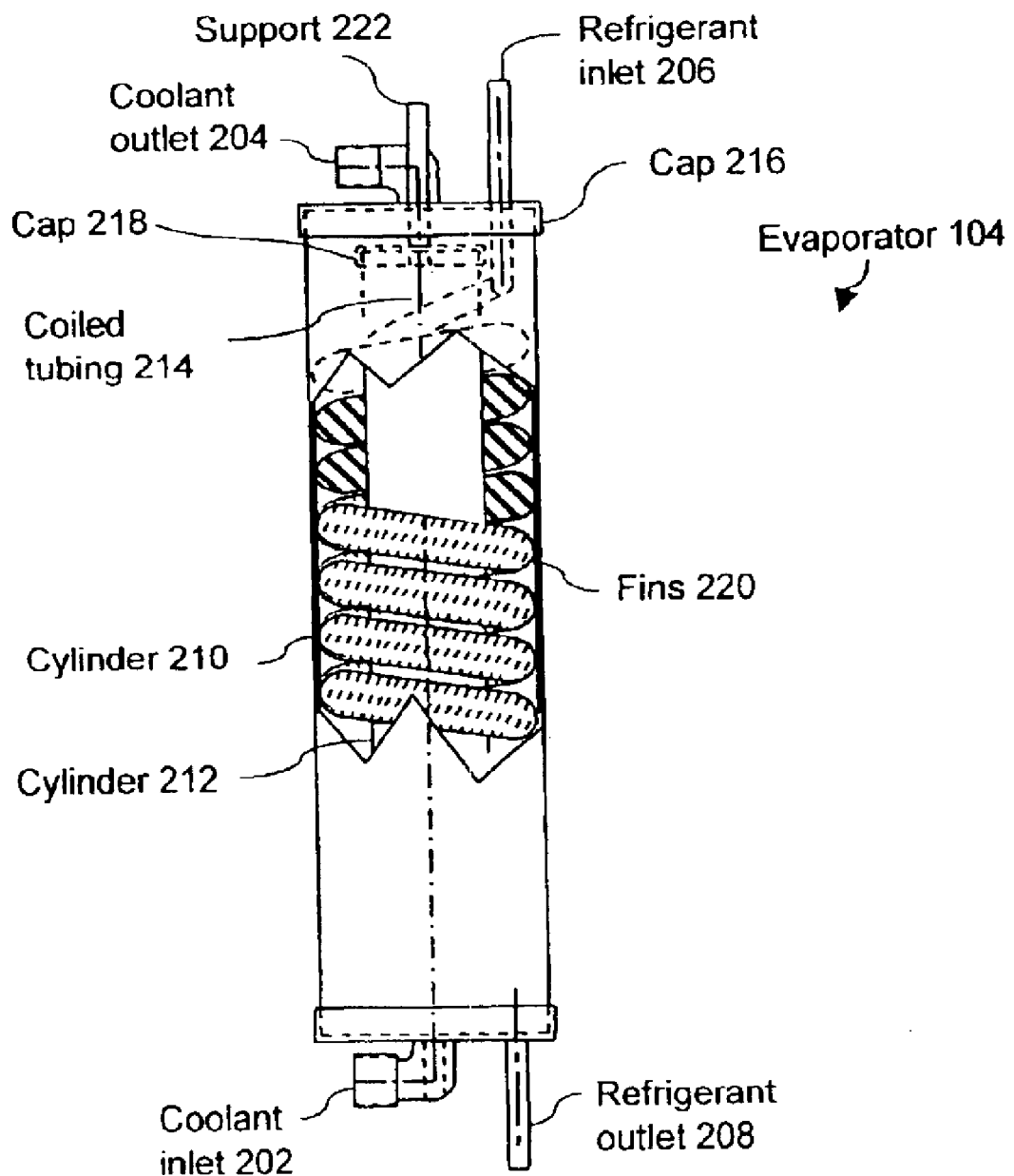
FIG. 2 is a schematic of the shell and coil type heat exchanging evaporator of FIG. 1.

FIG. 2 is a detail drawing of a first embodiment of evaporator 104, in accordance with the invention. Evaporator 104 includes a coolant inlet 202/114, a coolant outlet 204/116, a refrigerant inlet 206, a refrigerant outlet 208, an outer cylinder 210, an inner cylinder 212, coiled tubing 214, an outer cap 216, an inner cap 218, and fins 220.

Coolant inlet 202 is a segment of a coolant line that provides a coolant flow path to the inside of evaporator 104 at cap 216 through which coolant enters evaporator 104. Conversely, coolant outlet 204 is a segment of the coolant line that provides a coolant flow path with the inside of evaporator 104 at cap 218, through which coolant exits evaporator 104.

Refrigerant inlet 206 is a segment of a refrigerant line which connects to coiled tubing 214 through which refrigerant enters evaporator 104. Conversely, refrigerant outlet 208 is fed by refrigerant leaving coiled tubing 214.

Cylinder 210 is the outer shell of evaporator 104. Cylinder 212 is a sealed hollow cylinder. The cylinder 212 restricts the flow of coolant through evaporator 104 to the volume defined by the volume of cylinder 210 minus the volume of cylinder 212, thereby forcing coolant to flow across the heat transfer surface area provided by fins 220, and eliminating potential coolant bypass around the fins.

Coiled tubing 214 is a helically wound length of ⅜ inch OD copper tubing along which fins 220 are attached. Each turn of coil of finned tubing 214 comes into contact with the next turn at the fin tips. For the specific arrangement tested, the tubing diameter was 0.375" and had a fin height of 0.25" resulting in an overall diameter of 0.875 inch. This results in a pitch of about 0.875". Coiled tubing 214 is commercially available from a supplier (such as Heat Exchange Applied Technology, Orrville, Ohio) in a straight length or pre-coiled and includes fins 220 attached at the desired fin spacing and fin lengths. Typical fin spacing is between 0.06 and 0.08 inch. Typical fin height is between 0.25 and 0.38 inch.

Fins 220 are made of copper and have a thickness of about 0.015 inch and extend 0.25 inch from the tubing. The fins are typically made of a continuous metal ribbon which is then wrapped onto the tube with the width of the ribbon oriented perpendicular to the tube length. The resulting assembly has a diameter equal to the tube diameter plus two fin heights. The fins are wrapped in a helix so that after completing one wrap around the tube, the fins are offset by one fin spacing. Fins 220 are fixed to the tube by a tension wind method or by brazing to the coiled tubing 214 (prior to coiling of the tube), extending from the surface of coiled tubing 214 from the inner surface of cylinder 212 to the inner surface of cylinder 210. The goal of the attachment method is to provide adequate mechanical stability to allow coiling of the fin and tube assembly, and to provide effective thermal conduction from the fins to the tubing. Typically the fins and tubing are made of copper. Alternatively, the material of the tubing and the fins may be of aluminum or stainless steel.

Coiled tubing 214 is formed using a small mandrill and a rotating machine by holding stationary one end of the straight length of tubing and forming a coil. Such methods of forming coiled tubing 214 lengths are well known to the industry.

Cap 216 seals one end of the evaporator 104. The opposite end of cylinder 210 is also sealed by a cap 224. Likewise, inner cylinder 212 is sealed by two caps, one of which is cap 218, the other is not shown for clarity in the drawing.

Support 222 connects to the inner cylinder 212 and to the cap 216 to support the inner cylinder within the outer cylinder 210.

The material, and material thickness of the cylinders 210 and 212, and of the caps 216, 224 and 218 are selected to provide the proper pressure rating needed for the coolant loop when operating at very low temperatures. In operation the coolant mat be pressurized up to 100 psig. This pressure is internal to cylinder 210 and caps 216 and external to cylinder 212, caps 218, and the coiled tubing 214. Since thermal mass must be minimized, pressurization has an impact on the material selected. Additionally the method used to join the caps to the cylinder affects the material selection. For example, use of a welding process will typically require aluminum or stainless steel whereas used of a brazing process will typically require copper or stainless steel. The shape of the caps 216, 224, 218 are selected to provide an adequate pressure rating.

FIG. 2 shows a vertical orientation for the evaporator. This is important for purposes of enabling removal of coolant, or filling of coolant. For this purpose, the liquid drain valve 118 of FIG. 1 needs to be connected to the line connecting the coolant inlet 202 to the rest of the coolant loop.

Evaporator 104 was designed specifically for providing refrigeration to the industrial coolant Galden TH 70 and to coolants which have characteristics similar to those of Galden HT 70. Galden TH 70 is used in applications such as the semiconductor manufacturing industry for cooling the chucks upon which silicon wafers are retained during etching processes, and is characterized by a high viscosity and a poor heat transfer coefficient. The Evaporator 104 is capable of providing refrigeration to coolants having a kinematic viscosity of at least 0.2 centistrokes at 25 C.

The special coolant to which refrigeration was to be supplied, combined with customer restrictions, presented several limitations to the design of evaporator 104. Firstly, the coolant is cooled to −80 C with 500 W of refrigeration capacity. Further, the flow rate of the coolant is fixed at about 200 grams/sec (2 gallons/main), by a cold temperature pump and the circulation system supplied by the customer. Additionally, at these operating temperatures the viscosity of the coolant is very high, about 10 centistokes at −80 C. A large pressure drop across the evaporator is undesirable because it affects the pump energy input and the heat load on the refrigeration system. More specifically, higher coolant pressure drops require higher input power, and higher input power to achieve a given amount of coolant heat removal results in lower efficiency. Evaporator 104 was limited to a 2 PSI pressure drop across it. Further, the overall size of evaporator 104 was restricted due to spatial constraints of the system.

In operation, evaporator 104 is a cylindrical counter-flow shell and coil heat exchanger whose dimensions are about twelve inches in length and between three and four inches in diameter. The evaporator provides refrigeration to the coolant as follows. Warm liquid coolant enters evaporator 104 at coolant inlet 202 and is distributed evenly by virtue of the symmetrical arrangement of the components. Coolant fills the volume of evaporator 104 between cylinder 212 and cylinder 210 and is pumped toward coolant outlet 204 at a pressure between 10 and 20 PSI at a flow rate of 200 grams/sec (2 gallons/main). Refrigerant, meanwhile, is flowing through evaporator 104 in the opposite direction, from refrigerant inlet 206 through coiled tubing 214 and out of evaporator 104 at refrigerant outlet 208. The refrigerant flowing through the evaporator has a sufficient bulk heat transfer such that its temperature rises no more than three times the temperature change of the coolant as coolant is cooled by the evaporator. Use of a mixed refrigerant is preferred since it provides a significant temperature difference between the evaporator inlet 206 and outlet 208 and enables higher thermodynamic efficiency of the heat transfer since a more constant temperature difference is provided between refrigerant and coolant.

Coolant and refrigerant come into thermal contact while flowing counter to one another within evaporator 104 and heat is extracted from the coolant by the refrigerant and heats the refrigerant, thereby cooling the coolant.

The heat transfer that takes place within evaporator 104 is limited by the Galden, whose heat transfer coefficient is between 30 and 40 W/m²-K. Although the heat transfer coefficient of the refrigerant is between 600 and 800 W/m²-K, the overall heat transfer coefficient is restricted to the lesser of the two values, and thus is between 30 and 40 W/m²-K. This fact affects the heat exchange, which is defined by $$Q = kF\Delta T$$

where Q is the heat exchanged; k is the overall heat transfer coefficient (between 30 and 40 W/m²-K, as stated above); F is the heat transfer surface area;

and ΔT is between 3 and 4 degrees Celsius (dictated by the customer).

The only parameter of the above equation that is not fixed in a particular construction is F, the heat transfer surface area. Fins 220 provide a large surface area for heat transfer between the coolant and the refrigerant within the restricted volume of evaporator 104, thereby providing the desired cooling. About fourteen fins 220 were attached, in the above example, along every inch of coiled tubing 214, providing a heat transfer area between 1.4 and 1.7 square meters.

This design operates with a Reynolds number in the range of from about 3 to about 30, preferably from about 5 to about 15 and most preferably of about 10, based on the spacing between the fins. Having subsequent rows of finned tubing whose fins are offset from the prior row is preferred because it enhances heat transfer by preventing a fully developed hydrodynamic and thermal boundary layer. Specifically, it is preferred that fluid flowing near the in the center (maximum space between the fluid and the fins) of two fins when passing through fins attached to one coil, will flow much closer to the fins (minimum spacing between the fluid and a fin) attached to the next coil that the fluid passes by. Although this will create more pressure drop than if the fins of each coil are aligned, it improves heat transfer which enables a reduction in heat exchanger mass and coolant volume in the heat exchanger.

In a second embodiment, in accordance with the invention, the evaporator described in the first embodiment is combined with a mixed refrigerant including individual refrigerant components with boiling points that vary by at least 90 C from the coldest boiling component to the warmest boiling component in the mixture.

A list of refrigerants that can be mixed together to provide the required refrigeration performance are listed in Table 1.

TABLE 1

Refrigerant composition

| Ingredient Name | Range (% by weight) | Example (% by weight) | |
|---|---|---|---|
| Argon or Nitrogen | 0–20% | | |
| R-14 | 10–60% | R-14 | 22% |
| At least one of R-23, or ethane | 5–40% | R-23 | 9% |
| At least one of R-125, or R-143a, or R-32, or R-134a, or R-227ea, or R-218, or R-152a | 5–30% | R-125 | 9% |
| At least one of R-236fa, or R-245fa, or R-236ea or R-245ca, or E-347, or R-4112, or R-4310meec | 0–70% | R-236fa | 60% |

Table 1 is a listing of the refrigerant mixture used in conjunction with the present invention, including Argon or Nitrogen, along with refrigerants R-14, R-23, R-125, R-32, R-134a, R-227ea, R-218, R-152a, R-236fa, R-245fa, R-245ca, R-236ea. With the exception of E-347, R-4112, and R-4310meec, all refrigerants listed are designated in accordance with American Society of Heating and Refrigeration and Air Conditioning Engineering (ASHRAE) standard number 34.

E-347 is also known as 1-(methoxy)-1,1,2,2,3,3,3-heptafluoropropane (also CH3-O—CF2-CF2-CF3), 3 M product reference Hydrofluoroether 301.

R-4112 is known as dodecafluoropentane (also CF3CF2CF2CF2CF3).

R-4310meec (1,1,1,2,2,3,4,5,5,5-decafluoropentane) is commercialized as a solvent by DuPont and is known by the trade name Vertrel XF.

For most applications it is desired to have refrigerant components that are nonflammable and nontoxic. The specific blend listed meets these criteria and are the preferred refrigerants to use. This blend was applied in a refrigeration system without any phase separation, as described by the Longsworth Patent (cited above).

The other refrigerants listed are alternative refrigerants. Refrigerant R-245fa is a refrigerant for use with or instead of R-236fa. Likewise, R-236ea and R-245ca are good candidates for use with or instead of R-236fa should they be available.

Refrigerant E-347 is also another good refrigerant for use with or instead of R-236fa. However, a permissible exposure limit for E-347 is not yet established. Once known, its exposure limits will need to be reviewed for customer acceptance.

The following refrigerants are known to be flammable which makes them less desirable for use: R-32, R-143a, R-152a, ethane.

Refrigerants R-227ea and R-134a are not optimal refrigerants for most very low temperature applications because their boiling point is not optimum. Instead, R-125 is preferred.

Refrigerants R-218 and R-4112 are fully fluorinated compounds and have high global warming potentials. Therefore they are also not preferred. Additionally they are expected to produce a lower refrigeration system efficiency than the preferred refrigerants.

R-4310meec is considered to be toxic which makes it a less desirable refrigerant than the preferred refrigerants.

Table 1 lists the ingredients of the refrigerant mixture used favorably in conjunction with the present invention. The refrigerant mixture of Table 1 is characterized by a heat transfer coefficient between 600 and 800 W/m2. Further, the specific example refrigerant mixture of Table 1 is a nonflammable, nonchlorinated refrigerant blend, desirable due to increasingly restrictive environmental regulations.

In a third embodiment the heat exchanger described in FIG. 2 is used with the refrigerant mixture described in the second embodiment to cool a gas while causing a low pressure drop in the gas being cooled by the evaporator.

Some industrial applications make use of a gas as the coolant in which a blower is used to recirculate the gas within a cooling loop. In this case, as with the pumping of a liquid, excessive pressure drop across the evaporator requires additional pumping work to be performed on the gas by the blower which ultimately increases the thermal load on the evaporator. Therefore low pressure drop is essential for a successful design. Further, gasses typically have poor heat transfer properties not unlike the poor heat transfer of coolants like Galden TH 70. Use of the heat exchanger described in the first embodiment enables effective cooling of a gas stream with a low gas pressure drop.

In summary, a first feature of the invention is a means to achieve the desired cooling to Galden TH 70, an industrial coolant characterized by high viscosity and a poor heat transfer coefficient, by providing a large heat transfer surface area within a limited volume. This is effected without a high coolant pressure drop. Specifically, the shell and coil type heat exchanging evaporator in accordance with the invention provides the desired cooling to Galden TH 70 flowing through the evaporator at a rate of 200 g/s (2 gallons/main) at temperatures between −80 and −100 C with a maximum pressure drop across the evaporator of 2 PSI. The present invention allows the transfer of 500 W at −80 C and provides a heat transfer surface area between 1.4 and 1.7 square meters included within the limited evaporator dimensions of approximately twelve inches in length and between three and four inches in diameter.

A second feature of the invention is a means of allowing a short initial cool down period due to the minimized heat exchanger mass and the minimized volume of liquid coolant to be cooled during initial cool down. In speaking of "minimized", this is a practical engineering reduction in volume and mass and should not be construed as a mathematical or scientific minimum derived with precise multi-decimal tolerances.

A third feature of the invention is the use of a mixed refrigerant system with the evaporator design described where the mixed refrigerant is comprised of two refrigerants whose boiling points differ by at least 90 C.

What is claimed is:

1. A liquid chiller for cooling very low temperature coolant, said coolant being cooled to outlet temperature T2 from inlet temperature T1 at a predetermined mass flow and with limited pressure drop, comprising:
   a cylindrical outer casing having an initial internal volume, and including a coolant inlet and a coolant outlet, said coolant inlet and outlet communicating with said initial internal volume, said outer casing further including a refrigerant inlet and refrigerant outlet;
   an inner cylinder within said outer casing and having a common longitudinal axis with said outer casing, said inner cylinder occupying a substantial portion of said initial internal volume;
   a finned tubing of extended length connected between said refrigerant inlet and said refrigerant outlet for refrigerant flow therethrough, said finned tubing being wrapped around and contacting said inner cylinder and further occupying said initial internal volume, fins of said tubing extending toward an inner surface of said outer casing;
   in operation, coolant entering said volume at said coolant inlet flowing over said finned tubing to said coolant outlet, a cold refrigerant flowing through said finned tubing from said refrigerant inlet to said refrigerant outlet absorbing heat from said coolant,
   said outer casing and inner cylinder being constructed in materials and dimensions, and said fins and tubing being selected, to provide low mass and a coolant flow passage between the outer casing and inner cylinder around the finned tubing,
   said chiller providing rapid cool down of said coolant at start up and, in steady state operation, reducing the inlet temperature T1 of said coolant to said outlet temperature T2, at a predetermined mass flow, and with limited pressure drop and,
   said coolant has a kinematic viscosity of at least 10 centistokes at −80 degrees C.

2. A liquid chiller as in claim 1, wherein said outer casing and said inner cylinder are circular cylinders.

3. A liquid chiller as in claim 1, wherein closeness of said fins to said inner surface of said outer casing prevents any substantial bypass of said fins by said coolant flow during operation of said chiller.

4. A liquid chiller as in claim 3, wherein said chiller is sized for use with a refrigerant that is selected from the group consisting of a single refrigerant and a mixed refrigerant.

5. A liquid chiller as in claim 3, wherein said coolant can flow counterflow crossflow to said refrigerant for heat transfer.

6. A liquid chiller as in claim 3, wherein said chiller is sized for use with a coolant that is one of a liquid and a gas.

7. A liquid chiller as in claim 6, wherein said coolant is Galden TH 70.

8. A liquid chiller as in claim 4, wherein said refrigerant is a mixture of at least two components having normal boiling points at least 90 degrees C. apart.

9. A liquid chiller as in claim 4, wherein said refrigerant is a mixed refrigerant that is approximately 22% R-14, approximately 9% R-23, approximately 9% R-125, and approximately 60% R-236fa.

10. A liquid chiller as in claim 5, wherein the temperature increase of refrigerant passing through said chiller in operation is equal to or less than three times the temperature change in the coolant flow.

11. A liquid chiller as in claim 3, wherein said coolant when flowing over said finned surface has a Reynolds number of approximately 3 to 30.

12. A liquid chiller as in claim 1, wherein said inner cylinder is at least partially hollow and sealed off from said initial internal volume.

13. A liquid chiller as in claim 3, wherein said inner cylinder is at least partially hollow and sealed off from said initial internal volume.

14. A liquid chiller as in claim 7, wherein said inner cylinder is at least partially hollow and sealed off from said initial internal volume.

15. A closed cycle very low temperature refrigeration system comprising:
   a refrigeration unit for delivering low temperature, low pressure refrigerant to the refrigerant inlet of the evaporator, and receiving a return flow of said refrigerant at a higher temperature from the refrigerant outlet of the evaporator;
   a liquid chiller for cooling low temperature coolant, said coolant in steady state operation being cooled to outlet temperature T2 from inlet temperature T1 at a predetermined mass flow and with limited pressure drop, said liquid chiller including:
   a cylindrical outer casing having an initial internal volume, and including a coolant inlet and a coolant outlet, said coolant inlet and outlet communicating with said initial internal volume, said outer casing further including a refrigerant inlet receiving said refrigerant from said refrigeration unit and a refrigerant outlet returning said refrigerant to said refrigeration unit;
   an inner cylinder within said outer casing and having a common longitudinal axis with said casing, said inner cylinder occupying a substantial portion of said initial internal volume;
   a finned tubing of extended length connected between said refrigerant inlet and said refrigerant outlet for refrigerant flow therethrough, said finned tubing being wrapped around and contacting said inner cylinder and further occupying said initial internal volume, fins of said tubing extending toward an inner surface of said outer casing;
   in operation, coolant entering said volume at said coolant inlet flowing over said finned tubing to said coolant outlet, said cold refrigerant flowing through said finned tubing from said refrigerant inlet to said refrigerant outlet absorbing heat from said coolant,
   said outer casing and inner cylinder being constructed in materials and dimensions, and said fins and tubing being selected, to provide low mass and a coolant flow passage between the outer casing and inner cylinder around the finned tubing,
   said chiller providing rapid cool down of said coolant at start up and, in steady state operation, reducing the inlet temperature T1 of said coolant to said outlet temperature T2, at a predetermined mass flow, and with limited pressure drop and, said coolant has a kinematic viscosity of at least 10 centistokes at −80 degrees C.

16. A refrigeration system as in claim 15, wherein said outer casing and said inner cylinder are circular cylinders.

17. A refrigeration system as in claim 15, wherein closeness of said fins to said inner surface of said outer casing prevents any substantial bypass of said fins by said coolant flow during operation of said chiller.

18. A refrigeration system as in claim 17, wherein said refrigerant is one of a single refrigerant and a mixed refrigerant.

19. A refrigeration system as in claim 17, wherein said coolant flows counterflow to said refrigerant for heat transfer.

20. A refrigeration system as in claim 17, wherein said coolant is one of a liquid and a gas.

21. A refrigeration system as in claim 20, wherein said coolant is Galden TH 70.

22. A refrigeration system as in claim 18, wherein said refrigerant is a mixture of at least two components having component boiling points at least 90 degrees C. apart.

23. A refrigeration system as in claim 18, wherein said refrigerant is a mixed refrigerant that is approximately 22% of R-14, approximately 9% of R-23, approximately 9% of R-125, and approximately 60% of R-236fa.

24. A refrigeration system as in claim 17, wherein the temperature increase of refrigerant passing through said chiller in operation is equal to or less than three times the temperature change in the coolant flow.

25. A refrigeration system as in claim 17, wherein said coolant when flowing over said finned surface has a Reynolds number of approximately 3 to 30.

26. A refrigeration system as in claim 15, wherein said inner cylinder is at least partially hollow and sealed off from said initial internal volume.

27. A refrigeration system as in claim 17, wherein said inner cylinder is at least partially hollow and sealed off from said initial internal volume.

28. A refrigeration system as in claim 21, wherein said inner cylinder is at least partially hollow and sealed off from said initial internal volume.

29. A liquid chiller for cooling very low temperature coolant, said coolant being cooled to outlet temperature T2 from inlet temperature T1 at a predetermined mass flow and with limited pressure drop, comprising:

a cylindrical outer casing having an initial internal volume, and including a coolant inlet and a coolant outlet, said coolant inlet and outlet communicating with said initial internal volume, said outer casing further including a refrigerant inlet and refrigerant outlet;

an inner cylinder within said outer casing and having a common longitudinal axis with said outer casing, said inner cylinder occupying a substantial portion of said initial internal volume;

a finned tubing of extended length connected between said refrigerant inlet and said refrigerant outlet for refrigerant flow therethrough, said finned tubing being wrapped around and contacting said inner cylinder and further occupying said initial internal volume, fins of said tubing extending toward an inner surface of said outer casing;

in operation, coolant entering said volume at said coolant inlet flowing over said finned tubing to said coolant outlet, a cold refrigerant flowing through said finned tubing from said refrigerant inlet to said refrigerant outlet absorbing heat from said coolant, said outer casing and inner cylinder being constructed in materials and dimensions, and said fins and tubing being selected, to provide low mass and a coolant flow passage between the outer casing and inner cylinder around the finned tubing, said chiller providing rapid cool down of said coolant at start up and, in steady state operation, reducing the inlet temperature T1 of said coolant to said outlet temperature T2, at a predetermined mass flow, and with limited pressure drop and, said coolant is a liquid coolant having a kinematic viscosity of at least 0.2 centistokes at 25 degrees C. and 2 centistokes at −80 degrees C. and a pressure drop of 2 PSI or less.

30. A liquid chiller for cooling very low temperature coolant, said coolant being cooled to outlet temperature T2 from inlet temperature T1 at a predetermined mass flow and with limited pressure drop, comprising:

a cylindrical outer casing having an initial internal volume, and including a coolant inlet and a coolant outlet, said coolant inlet and outlet communicating with said initial internal volume, said outer casing further including a refrigerant inlet and refrigerant outlet;

an inner cylinder within said outer casing and having a common longitudinal axis with said outer casing, said inner cylinder occupying a substantial portion of said initial internal volume;

a finned tubing of extended length connected between said refrigerant inlet and said refrigerant outlet for refrigerant flow therethrough, said finned tubing being wrapped around and contacting said inner cylinder and further occupying said initial internal volume, fins of said tubing extending toward an inner surface of said outer casing;

in operation, coolant entering said volume at said coolant inlet flowing over said finned tubing to said coolant outlet, a cold refrigerant flowing through said finned tubing from said refrigerant inlet to said refrigerant outlet absorbing heat from said coolant, said outer casing and inner cylinder being constructed in materials and dimensions, and said fins and tubing being selected, to provide low mass and a coolant flow passage between the outer casing and inner cylinder around the finned tubing, said chiller providing rapid cool down of said coolant at start up and, in steady state operation, reducing the inlet temperature T1 of said coolant to said outlet temperature T2, at a predetermined mass flow, and with limited pressure drop and, said coolant when flowing over said finned surface has a Reynolds number of approximately 3 to 30.

31. A liquid chiller for cooling very low temperature coolant, said coolant being cooled to outlet temperature T2 from inlet temperature T1 at a predetermined mass flow and with limited pressure drop, comprising:

a cylindrical outer casing having an initial internal volume, and including a coolant inlet and a coolant outlet, said coolant inlet and outlet communicating with said initial internal volume, said outer casing further including a refrigerant inlet and refrigerant outlet;

an inner cylinder within said outer casing and having a common longitudinal axis with said outer casing, said inner cylinder occupying a substantial portion of said initial internal volume;

a finned tubing of extended length connected between said refrigerant inlet and said refrigerant outlet for refrigerant flow therethrough, said finned tubing being wrapped around and contacting said inner cylinder and further occupying said initial internal volume, fins of said tubing extending toward an inner surface of said outer casing;

in operation, coolant entering said volume at said coolant inlet flowing over said finned tubing to said coolant outlet, a cold refrigerant flowing through said finned tubing from said refrigerant inlet to said refrigerant outlet absorbing heat from said coolant, said outer casing and inner cylinder being constructed in materials and dimensions, and said fins and tubing being selected, to provide low mass and a coolant flow passage between the outer casing and inner cylinder around the finned tubing, said chiller providing rapid cool down of said coolant at start up and, in steady state operation, reducing the inlet temperature T1 of said coolant to said outlet temperature T2, at a predetermined mass flow, and with limited pressure drop and, said refrigerant is a mixed refrigerant that is approximately 22% of R-14, approximately 9% of R-23, approximately 9% of R-125, and approximately 60% of R-236fa.

* * * * *

UNITED STATES PATENT AND TRADEMARK OFFICE
CERTIFICATE OF CORRECTION

PATENT NO.    : 6,886,361 B2
DATED         : May 3, 2005
INVENTOR(S)   : Kevin Flynn It is certified that error appears in the above-identified patent and that said Letters Patent is hereby corrected as shown below:

Column 1,
Line 16, please delete "TH 70" and insert -- HT 70 --.

Column 2,
Line 59, please delete "TH 70" and insert -- HT 70 --.

Column 3,
Line 2, please delete "TH 70" and insert -- HT 70 --.

Column 4,
Lines 45 and 59, please delete "TH 70" and insert -- HT 70 --.

Column 7,
Lines 59 and 61, please delete "TH 70" and insert -- HT 70 --.

Column 10,
Lines 47, 51 and 57, please delete "TH 70" and insert -- HT 70 --.

Column 11,
Line 59, please delete "counterflow crossflow" and insert -- counterflow/crossflow --;
Line 64, please delete "TH 70" and insert -- HT 70 --.

Column 13,
Line 16, please delete "TH 70" and insert -- HT 70 --.

Signed and Sealed this

Thirtieth Day of August, 2005

JON W. DUDAS
*Director of the United States Patent and Trademark Office*